(12) United States Patent
Reiffel

(10) Patent No.: US 7,099,070 B2
(45) Date of Patent: Aug. 29, 2006

(54) MULTI-IMAGER MULTI-SOURCE MULTI-USE CODED DATA SOURCE DATA INPUT PRODUCT

(76) Inventor: Leonard Reiffel, 602 Deming Pl., Chicago, IL (US) 60614

( * ) Notice: Subject to any disclaimer, the term of this patent is extended or adjusted under 35 U.S.C. 154(b) by 629 days.

(21) Appl. No.: 10/432,799

(22) PCT Filed: Dec. 10, 2001

(86) PCT No.: PCT/US01/48033

§ 371 (c)(1),
(2), (4) Date: May 27, 2003

(87) PCT Pub. No.: WO02/49340

PCT Pub. Date: Jun. 20, 2002

(65) Prior Publication Data

US 2005/0102332 A1    May 12, 2005

Related U.S. Application Data

(60) Provisional application No. 60/256,086, filed on Dec. 15, 2000.

(51) Int. Cl.
*G02F 7/00* (2006.01)
*G06F 7/00* (2006.01)
*H03M 1/22* (2006.01)

(52) U.S. Cl. ................ 359/326; 341/13; 341/14; 708/131

(58) Field of Classification Search ........... 359/326; 708/100, 131; 341/13, 14
See application file for complete search history.

(56) References Cited

U.S. PATENT DOCUMENTS

| 4,053,233 A | 10/1977 | Bien et al. |
| 4,099,050 A | 7/1978 | Sauermann |
| 4,228,430 A | 10/1980 | Iwamura et al. |
| 4,439,672 A | 3/1984 | Salaman |
| 4,603,231 A | 7/1986 | Reiffel et al. |
| 4,637,797 A | 1/1987 | Whitney et al. |
| 4,650,334 A | 3/1987 | Alster et al. |
| 4,684,349 A | 8/1987 | Ferguson et al. |
| 4,945,914 A | 8/1990 | Allen |
| 4,998,441 A | 3/1991 | Stuart |
| 5,107,350 A | 4/1992 | Omori |

(Continued)

FOREIGN PATENT DOCUMENTS

EP    0 062 473    10/1982

(Continued)

*Primary Examiner*—John D. Lee
(74) *Attorney, Agent, or Firm*—William J. Hallihan

(57) ABSTRACT

Working with an information system operating an application—are an imager, a coded data source, and a computer-readable signal-bearing medium signal (FIG. 1, 11, 12, 13, 14, 15, 16, 17, 18, 21, 22, 23, 24, 25, 26, 27, 31, 32, 33, 41, 42, 43, 44, 45, 51, 52, 53, 54, 55, 91, 92, 93) connected to the information system where light from the data source—which represents data—is detected by the imager which inputs a signal—which represents the light—to the information system; where a use component of the medium causes the data to be made available to the application with the application being specified by the data; and where: the image can be from a plurality of imagers signal connected to the information system; the coded data source can be from a plurality of coded data sources; the application can be from a plurality of applications operated by the information system; and the medium can have a plurality of components which cause uses of data, management of imagers, and output signals.

39 Claims, 1 Drawing Sheet

U.S. PATENT DOCUMENTS

Figure 1:
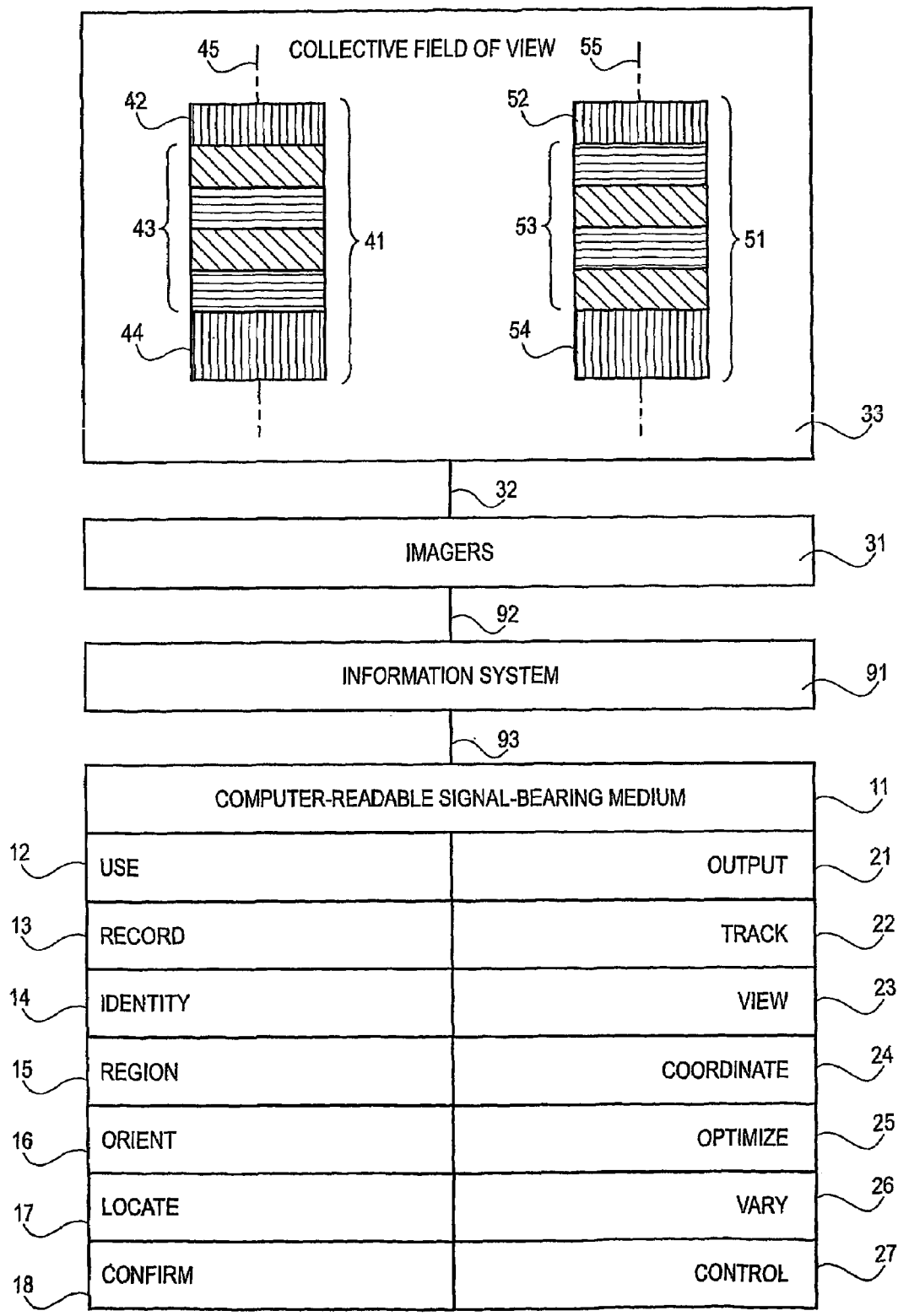

| | | |
|---|---|---|
| 5,111,410 A | 5/1992 | Nakayama et al. |
| 5,181,015 A | 1/1993 | Marshall et al. |
| 5,214,414 A | 5/1993 | Levine et al. |
| 5,260,556 A | 11/1993 | Lake et al. |
| 5,282,045 A | 1/1994 | Mimura et al. |
| 5,414,251 A * | 5/1995 | Durbin .................... 235/462.2 |
| 5,415,553 A | 5/1995 | Szmidla |
| 5,448,261 A | 9/1995 | Koike et al. |
| 5,453,015 A | 9/1995 | Vogel |
| 5,507,527 A | 4/1996 | Tomioka et al. |
| 5,537,211 A | 7/1996 | Dial |
| 5,563,401 A | 10/1996 | Lemelson |
| 5,644,126 A | 7/1997 | Ogawa |
| 5,710,416 A | 1/1998 | Belknap et al. |
| 5,712,658 A | 1/1998 | Arita et al. |
| 5,729,220 A | 3/1998 | Russell |
| 5,756,981 A | 5/1998 | Roustaei et al. |
| 5,789,732 A | 8/1998 | McMahon et al. |
| 5,795,161 A | 8/1998 | Vogel |
| 5,821,523 A | 10/1998 | Bunte et al. |
| 5,822,735 A | 10/1998 | De Lapa et al. |
| 5,825,045 A | 10/1998 | Koenck et al. |
| 5,826,578 A | 10/1998 | Curchod |
| 5,835,237 A | 11/1998 | Ebrahimi |
| 5,852,211 A | 12/1998 | Dümpelmann et al. |
| 5,852,823 A | 12/1998 | De Bonet |
| 5,867,265 A | 2/1999 | Thomas |
| 5,912,700 A | 6/1999 | Honey et al. |
| 5,917,472 A | 6/1999 | Perälä |
| 5,917,486 A | 6/1999 | Rylander |
| 5,963,145 A | 10/1999 | Escobosa |
| 5,982,352 A | 11/1999 | Pryor |
| 5,988,505 A | 11/1999 | Shellhammer |
| 6,000,612 A | 12/1999 | Xu |
| 6,047,893 A | 4/2000 | Saporetti |
| 6,048,117 A | 4/2000 | Banton |
| 6,056,199 A | 5/2000 | Wiklof et al. |
| 6,082,619 A | 7/2000 | Ma et al. |
| 6,118,848 A | 9/2000 | Reiffel |
| 6,121,953 A | 9/2000 | Walker |
| 6,155,489 A | 12/2000 | Collins, Jr. et al. |
| 6,163,946 A | 12/2000 | Pryor |
| 6,167,607 B1 | 1/2001 | Pryor |
| 6,301,763 B1 | 10/2001 | Pryor |
| 6,311,214 B1 | 10/2001 | Rhoads |
| 6,314,631 B1 | 11/2001 | Pryor |
| 6,317,118 B1 | 11/2001 | Yoneno |
| 6,317,953 B1 | 11/2001 | Pryor |
| 6,330,973 B1 | 12/2001 | Bridgelall et al. |
| 6,335,685 B1 | 1/2002 | Schrott et al. |
| 6,446,871 B1 * | 9/2002 | Buckley et al. ........ 235/472.03 |
| 6,542,083 B1 | 4/2003 | Richley et al. |
| 6,545,670 B1 | 4/2003 | Pryor |
| 6,708,885 B1 | 3/2004 | Reiffel |
| 6,720,949 B1 | 4/2004 | Pryor et al. |
| 6,750,848 B1 | 6/2004 | Pryor |
| 6,766,036 B1 | 7/2004 | Pryor |
| 6,945,460 B1 * | 9/2005 | Reiffel ..................... 235/450 |
| 7,000,840 B1 * | 2/2006 | Reiffel ................... 235/462.41 |
| 2002/0036617 A1 | 3/2002 | Pryor |
| 2002/0183961 A1 | 12/2002 | French et al. |
| 2003/0222145 A1 | 12/2003 | Reiffel |
| 2004/0027455 A1 | 2/2004 | Reiffel |
| 2004/0041027 A1 | 3/2004 | Reiffel |
| 2004/0125224 A1 | 7/2004 | Reiffel |
| 2004/0135766 A1 | 7/2004 | Reiffel |
| 2004/0188525 A1 | 9/2004 | Reiffel |
| 2004/0195327 A1 | 10/2004 | Reiffel |

FOREIGN PATENT DOCUMENTS

| | | |
|---|---|---|
| EP | 0 840 248 | 5/1998 |
| EP | 1 020 810 | 7/2000 |
| FR | 2 694 827 | 2/1994 |
| WO | WO 87/07106 | 11/1987 |
| WO | WO 93/18478 | 9/1993 |
| WO | WO 96/32690 | 10/1996 |
| WO | WO 99/36836 | 7/1999 |
| WO | WO 99/66441 | 12/1999 |

* cited by examiner

MULTI-IMAGER MULTI-SOURCE MULTI-USE CODED DATA SOURCE DATA INPUT PRODUCT

This application claims benefit of U.S. provisional application 60/256,086 filed 15 Dec. 2000.

The product—which works with an information system—comprises a first coded data source which specifies a first application operated by the information system, a first imager which detects light from the first coded data source and inputs a signal to the information system, and a computer-readable signal-bearing medium which routs data represented by the first coded data source to the first application.

First light from the first coded data source—which represents first data—is detected by the first imager which inputs a first signal—which represents the first light—to the information system. A use component of the medium causes at least part of the first data to be made available to the first application. The first application is specified by the first data.

The first imager can be from a plurality of imagers all signal connected to the information system. The first coded data source can be from a plurality of coded data sources. The first application can be from a plurality of applications operated by the information system. The medium can have a plurality of components which cause specific uses of data, cause management of the imagers, and cause output of signals.

The invention provides progress over prior art shown for example in U.S. Pat. No. 5,912,700 by Honey 15 Jun. 1999, U.S. Pat. No. 4,998,441 by Stuart 12 Mar. 1991, U.S. Pat. No. 4,099,050 by Sauermann 04 Jul. 1978, and U.S. Pat. No. 4,053,233 by Bein 11 Oct. 1977.

The product is depicted schematically in the figure.

The data input product—which works with an information system 91—comprises a first coded data source, a first imager, and a computer-readable signal-bearing medium 11.

A first coded data source—41 for example—represents first data. A first imager which is signal connected with the information system has a first field of view extending along a first triad of orthogonal axes. The first field of view overlaps the first coded data source.

When the first imager is from a plurality of imagers 31, all signal connected 92 with the information system, the first field of view is in a collective field of view 33 of the plurality of imagers. The collective field of view can have parts which overlap other parts, can have parts which do not overlap other parts but meet other parts, and can have parts which do not overlap any other parts and do not meet any other parts. The collective field of view and parts of the collective field of view can change over time.

A first signal is caused by the first imager when the first imager detects first light from the first coded data source. The first light represents the first data. The first signal is input to the information system. The first signal represents the first light and thus represents the first data. When the first imager is from a plurality of imagers, the first light is part of collective light 32 detected by the plurality of imagers.

When the first coded data source is from a plurality of coded data sources, a second coded data source—51 for example—from the plurality of coded data sources source in the first field of view can specify second data. The first imager can detect first light from the first coded data source and second light from second coded data source concurrently and the first signal can represent the first light and the second light.

"Detect light" here and throughout means not only detecting the presence of light but also means detecting the specific properties of the light which represent first data so that the imager can cause a signal which represents the first data. Detecting light concurrently from several spatially separated coded data sources distinguishes the imager from a bar code reader which can not concurrently detect light from several spatially separated bar codes with the meaning of "detect" here.

The computer-readable signal-bearing medium is signal connected 93 with the information system. The medium has components which cause various actions by causing the information system to cause the actions. The medium has a use component 12 which causes at least part of the first data to be made available to a first application operated by the information system, when the first data specifies the first application.

When the imager detects the first light and can resolve the first light the first signal represents the first data. When the imager detects the first light but can not resolve the first light sufficiently for the first signal to represent the first data the medium can cause actions described below.

The medium can also have an output component 21 which is adapted to cause output of first output data calculated by the first application using the first data, when the use data specifies output. For example, the first data can represent a query and the first output data can represent an answer.

When the first coded data source is from a plurality of coded data sources, and the first application is from a plurality of applications operated by the information system, a second coded data source from the plurality of coded data sources can specify a second application from the plurality of coded data sources. The medium can cause at least part of the second data to be made available to the second application.

The medium can have a record component 13 which causes at least part of the first data to be recorded by the information system as part of use data available to the information system, when the first data allows recording. In a form of the product all coded data sources from a plurality of coded data sources can allow recording. In a form of the product only several coded data sources from the plurality of coded data sources can allow recording.

The medium can have an identity component 14 which causes an identity of the first coded data source to be recorded by the information system as part of the use data, when the first data allows recording of the identity. In one form of the product all coded data sources from a plurality of coded data sources can allow recording of the identity. In a form of the invention only several coded data sources from the plurality of coded data sources can allow recording of the identity.

The medium can have a region component 15 which is adapted to cause an imager from the plurality of imagers to image a region of space specified by the use data. In one form of the product any first coded data source from a plurality of coded data sources can specify a first region of space to be imaged. For example, there could be use data needed by an application in the first region. In this example the use data could be analog use data, digital use data, and combinations if these.

In a form of the product the medium can cause the imager to image a region of space which is not specified by any coded data source but is caused to be specified by the region component and the use data. For example, if the light from a coded data source detected by a first imager is not sufficient to represent the first data, then the medium can cause various actions such as zooming the first imager in on the region of space containing the coded data source, moving the first imager to better view the region of space, assigning another imager from a plurality of imagers to view the region of space, and combinations of these and other view improving actions.

The medium can have an orient component 16 which is adapted to cause the spatial location of a first coded data source to be recorded by the information system as part of the use data as a reference point. In a form of the product the causation here can occur when a coded data source specifies orienting. For example several coded data sources from a plurality of coded data sources can be dedicated reference points and located strategically in an environment.

In a form of the product the causation here can occur via interaction between the medium and the use data even though no coded data source specifies orienting. For example, the medium can cause coded data sources in an environment which the use data show to be stable to be recorded as reference points.

The medium can have a view component 23 which is adapted to cause a change in the collective field of view. In a form of the product a coded data source can specify a change in the collective field of view. In a form of the product the medium using the use data can specify a change in the field of view without any coded data source specifying the change.

The medium can have a locate component 17 which is adapted to cause location of the first coded data source relative to at least one reference point. In a form of the product the first coded data source can specify the locating. In a form of the product the medium using the use data can cause the locating without any coded data source specifying the locating.

The medium can have a track component 22 which is adapted to cause a tracking time series of locations of the first coded data source to be recorded by the information system as part of the use data. In a form of the product the first coded data source can specify the tracking.

In an example, a person can change the position of the first coded data source in the first field of view. The first data can be the position of the first coded data source. The first output data can be a display of a cursor tracking the positions of the code region. In another example where a person changes the position of the first coded data source in the first field of view, the first output data can control a process. The process can be motions of a device.

In a form of the product the medium using the use data can specify the tracking. For example, if a coded data source is located near a sensitive part of an environment at a time, then the medium can cause the later locations of that coded data source to be tracked at later times.

The medium can have a confirm component 18 which is adapted to cause determination that the tracking time series and the first data are consistent.

The medium can have a coordinate component 24 which causes the information system to use the use data to cause coordination of at least some imagers from the plurality of imagers. The view component and the confirm component can be components of the coordinate component.

The coordinate component can cause analysis of use data to oversee the actions of imagers and medium components. The coordinate component can cause management of the actions of the imagers via the output component and can cause management of actions of the medium components.

The coordinate component can cause variation of all of the variable elements of the imagers. For example the coordinate component can cause adjustment of the focus of an imager to optimize resolution.

The coordinate component can cause changes in the field of view of an imager and changes in the collective field of view. The coordinate component can cause at least a first imager to scan over a first field of view.

The coordinate component can cause assignment of a specific imager to specific coded data source. The coordinate component can cause passing on of the assignment from a first imager to a second imager when the second imager can better detect light from the coded data source. The coordinate component can cause use of extrapolation to assign an imager to pick up a coded data source as it returns from being out of sight of the imagers.

The coordinate component can cause changes in illumination of coded data sources. The coordinate component can cause modulation of the illumination to help resolve coded data sources over background light.

The medium can have an optimize component 25 which causes generation of an optimum path from the first coded data source to a target location, when the use data specifies optimizing.

The medium can have a vary component 26 which causes variable data to be recorded as part of the use data, when the first data specifies variation. The variable data can be part of the first data. The variable data can be caused by the region component of the medium to be imaged from a region of space specified by the first data. The first data can specify that a time series of values of the variable data be recorded as part of the use data.

The medium can have a control component 27 which causes generation of a control signal, when first data specifies control. The control signal can interact with an agent associated with the first data. An agent associated with the first data can be a being or a device. An agent can be identified by the first data. An agent can change the first data. The control signal can be electrical, photonic, visual, audible, tactile, and any other form useful to the being or device comprising the agent.

In an example, variable data can indicate the value of a property (temperature for example) of a process. The control signal can be input to a control device controlling the process. The control device can use the control signal to change the process accordingly.

Light from any first coded data source can represent first data by means of various physical properties of light in fixed, variable, and modulated modes. These physical properties of light comprise intensities, frequencies, phases, polarizations, entanglements, blink rates, decay times, external shapes, internal shapes, linear motions, rotational motions, strain motions, distances from at least one reference point, and combinations of two and more physical properties such as these. First data can be represented by a pattern comprising these physical properties in fixed, variable, and modulated modes.

Light from any first coded data source can have various origins such as light reflected from ambient sources, a light source at the coded data source, light emitted after energizing by suitable radiation, light with a characteristic decay time emitted after energizing by suitable radiation, a light source adjacent to the imager illuminating the coded data source, and combinations of these.

Light from any first coded data source is not limited to visible light. For example, infrared can be used, and millimeter and longer wavelengths can be used. Light can be radiating energy from any portion of the electromagnetic spectrum which can provide the functions required here.

Other forms of radiating energy—such as acoustic energy—which can provide the functions required here are included in the meaning of "light" here.

The imager can be the dual mode imager of patent application PCTUS/01/13742 filed 30 Apr. 2001 and published as WO 01/84475 A1 08 Nov. 2001. Coded data sources 41, 51 which work well with the dual mode imager have retro-reflecting regions 42, 44, 52, 54 which are detected by the locate mode of the imager and have color regions 43, 53 which represent data and are detected by the react mode of the imager. A size differential between the retro-reflecting bands defines a direction 45, 55. Other imagers and other forms of coded data sources can be used.

The coordinate component of the medium can cause a coded data source to be illuminated by light with specific properties, and this light can comprise the locate light for a dual mode imager. The coordinate component can cause this light to follow a moving coded data source.

The imager can have several elements which selectively detect portions of a range of values of a physical property of light from a coded data source, with the several portions detected by the several imager elements being combined to detect the full range of the physical property of light without forming an image of the coded data source.

At least some imagers from the plurality of imagers can be incorporated in a flexible sheet. At least part of the medium can be incorporated in a flexible sheet. At least part of the information system can be incorporated in the flexible sheet. At least some coded data sources from the plurality of coded data sources can be incorporated in the flexible sheet. Various combinations of these elements can be incorporated together in a flexible sheet. Power sources can also be incorporated in the flexible sheet.

A "signal" from a first product part to a second product part and a first product part being "signal connected" with a second product part here, and throughout, mean that a first physical state of the first product part causes a second physical state of the second product part. This can occur by various direct causal means and can occur by any of various transmission means. Transmitted signals can be any of various point-to-point and broadcast forms of energy transmission such as wireless and via wires, cables, and fibers. Parts of transmitted signals can reside with one form of the transmitted signal, parts can reside with a second form of transmitted signal, and parts can reside with various combinations of transmitted signals.

The several causes here can act via any of various processing modes. The processing can utilize configured processing elements such as fixed circuits, can utilize configurable processing elements such as field programmable gate arrays and neural networks, can utilize instructions in a data-bearing medium, and can utilize combinations of these. The processing can be stand alone, can act via a local information system, can act via a networked information system, and can act via combinations of these.

The invention claimed is:

1. A data input product adapted to work with an information system, the product comprising:
   a first coded data source,
   the first coded data source representing first data;
   first light from the first coded data source,
   the first light representing the first data;
   a first imager,
   the first imager being signal connected with the information system,
   the first imager having a first field of view,
   the first field of view extending along a first triad of orthogonal axes,
   the first field of view overlapping the first coded data source;
   a first signal,
   the first signal being caused by the first imager when the first imager detects the first light from the first coded data source,
   the first signal being input to the information system,
   the first signal representing the first light;
   a computer-readable signal-bearing medium,
   the medium being signal connected with the information system,
   the medium having a use component,
   the use component causing at least part of the first data to be made available to a first application operated by the information system, when the first data specifies the first application.

2. The product of claim 1 further comprising an output component of the medium, the output component being adapted to cause output of first output data generated by the first application.

3. The product of claim 1 wherein the first coded data source is from a plurality of coded data sources.

4. The product of claim 1 wherein:
   the first imager is from a plurality of imagers,
   the plurality of imagers has a collective field of view,
   the first field of view is in the collective field of view.

5. The product of claim 1 wherein the first application is from a plurality of applications operated by the information system.

6. The product of claim 1 wherein:
   the first coded data source is from a plurality of coded data sources;
   the first imager is from a plurality of imagers,
   the plurality of imagers has a collective field of view,
   the first field of view is in the collective field of view; and
   the first application is from a plurality of applications operated by the information system.

7. The product of claim 6 further comprising a record component of the medium, the record component causing at least part of the first data to be recorded by the information system as part of use data available to the information system, when the first data allows recording.

8. The product of claim 7 further comprising an identity component of the medium, the identity component causing an identity of the first coded data source to be recorded by the information system as part of the use data, when the first data allows recording of the identity.

9. The product of claim 7 further comprising a region component of the medium, the region component being adapted to cause an imager from the plurality of imagers to image a region of space.

10. The product of claim 7 further comprising an orient component of the medium, the orient component being adapted to cause the spatial location of the first coded data source to be recorded by the information system as part of the use data as a reference point.

11. The product of claim 7 further comprising a view component of the medium, the view component being adapted to cause the collective field of view to change.

12. The product of claim 7 further comprising a locate component of the medium, the locate component being adapted to cause location of the first data source relative to at least one reference point.

13. The product of claim 7 further comprising a coordinate component of the medium, the coordinate component being adapted to cause coordination of at least some imagers from the plurality of imagers.

14. The product of claim 7 further comprising a track component of the medium, the track component being adapted to cause a tracking time series of locations of the first data source to be recorded by the information system as part of the use data.

15. The product of claim 14 further comprising a confirm component of the medium, the confirm component which is adapted to cause determination that the tracking time series and the first data are consistent, when the use data specifies confirmation.

16. The product of claim 7 further comprising an optimize component of the medium, the optimize component causing the information system to generate an optimum path from the first coded data source to a target location, when the use data specifies optimizing.

17. The product of claim 7 further comprising a vary component of the medium, the vary component causing variable data to be recorded by the information system as part of the use data, when the first data specifies variation.

18. The product of claim 17 further comprising a control component of the medium, the control component causing a control signal to be generated by the information system, when first data specifies control.

19. A data input product adapted to work with an information system, the product comprising:
   a first coded data source,
   the first coded data source being from a plurality of coded data sources,
   the first coded data source representing first data;
   first light from the first coded data source,
   the first light representing the first data;
   a first imager,
   the first imager having a first field of view,
   the first imager being from a plurality of imagers,
   the plurality of imagers having a collective field of view,
   the collective field of view overlapping at least some coded data sources from the plurality of coded data sources,
   the first field of view being in the collective field of view,
   the first field of view extending along a first triad of orthogonal axes,
   the first field of view overlapping the first coded data source,
   each imager from the plurality of imagers being signal connected with the information system,
   the first imager being signal connected with the information system;
   a first signal,
   the first signal being caused by the first imager when the first imager detects the first light from the first coded data source,
   the first signal being input to the information system,
   the first signal representing the first light;
   a computer-readable signal-bearing medium,
   the medium being signal connected with the information system,
   the medium having a use component,
   the use component causing at least part of the first data to be made available to a first application operated by the information system, when the first data specifies the first application, the first application being from a plurality of applications.

20. The product of claim 19 further comprising an output component of the medium, the output component being adapted to cause output of first output data generated by the first application.

21. The product of claim 19 further comprising a record component of the medium, the record component causing at least part of the first data to be recorded by the information system as part of use data available to the information system, when the first data allows recording.

22. The product of claim 21 further comprising an identity component of the medium, the identity component causing an identity of the first coded data source to be recorded by the information system as part of the use data, when the first data allows recording of the identity.

23. The product of claim 21 further comprising a region component of the medium, the region component being adapted to cause an imager from the plurality of imagers to image a region of space.

24. The product of claim 21 further comprising an orient component of the medium, the orient component being adapted to cause the spatial location of the first coded data source to be recorded by the information system as part of the use data as a reference point.

25. The product of claim 21 further comprising a view component of the medium, the view component being adapted to cause the collective field of view to change.

26. The product of claim 21 further comprising a locate component of the medium, the locate component being adapted to cause location of the first data source relative to at least one reference point.

27. The product of claim 21 further comprising a coordinate component of the medium, the coordinate component which is adapted to cause coordination of at least some imagers from the plurality of imagers.

28. The product of claim 21 further comprising a track component of the medium, the track component being adapted to cause a tracking time series of locations of the first data source to be recorded by the information system as part of the use data.

29. The product of claim 28 further comprising a confirm component of the medium, the confirm component being adapted to cause determination that the tracking time series and the first data are consistent, when the use data specifies confirmation.

30. The product of claim 21 further comprising a optimize component of the medium, the optimize component causing the information system to generate an optimum path from the first coded data source to a target location, when the use data specifies optimizing.

31. The product of claim 21 further comprising a vary component of the medium, the vary component causing variable data to be recorded by the information system as part of the use data, when the first data specifies variation.

32. The product of claim 31 further comprising a control component of the medium, the control component causing a control signal to be generated by the information system, when first data specifies control.

33. The product of claim 19 wherein at least some imagers from the plurality of imagers are incorporated in a flexible sheet.

34. The product of claim 33 wherein at least some of the medium is incorporated in the flexible sheet.

35. The product of claim 19 where in at least some coded data sources from the plurality of coded data sources are incorporated in a flexible sheet.

36. A data input product adapted to work with an information system, the product comprising:
- a first coded data source,
- the first coded data source being from a plurality of coded data sources,
- the first coded data source representing first data;
- first light from the first coded data source,
- the first light representing the first data;
- a first imager,
- the first imager having a first field of view,
- the first imager being from a plurality of imagers,
- the plurality of imagers having a collective field of view,
- the collective field of view overlapping at least some coded data sources from the plurality of coded data sources,
- the first field of view being in the collective field of view,
- the first field of view extending along a first triad of orthogonal axes,
- the first field of view overlapping the first coded data source,
- each imager from the plurality of imagers being signal connected with the information system,
- the first imager being signal connected with the information system;
- a first signal,
- the first signal being caused by the first imager when the first imager detects the first light from the first coded data source,
- the first signal being input to the information system,
- the first signal representing the first light;
- a computer-readable signal-bearing medium,
- the medium being signal connected with the information system,
- the medium having a use component,
- the use component causing at least part of the first data to be made available to a first application operated by the information system, when the first data specifies the first application, the first application being from a plurality of applications;
- a record component of the medium,
- the record component causing at least part of the first data to be recorded by the information system as part of use data available to the information system, when the first data allows recording;
- an identity component of the medium,
- the identity component causing an identity of the first coded data source to be recorded by the information system as part of the use data, when the first data allows recording of the identity;
- a coordinate component of the medium,
- the coordinate component being adapted to cause coordination of at least some imagers from the plurality of imagers.

37. The product of claim 36 wherein at least some imagers from the plurality of imagers are incorporated in a flexible sheet.

38. The product of claim 37 wherein at least some of the medium is incorporated in the flexible sheet.

39. The product of claim 36 where in at least some coded data sources from the plurality of coded data sources are incorporated in a flexible sheet.

* * * * *